US007490367B1

(12) United States Patent
Litwiller et al.

(10) Patent No.: US 7,490,367 B1
(45) Date of Patent: Feb. 17, 2009

(54) SOLID AND LIQUID WASTE DRYING BAG

(75) Inventors: Eric Litwiller, San Mateo, CA (US); John A. Hogan, Menlo Park, CA (US); John W. Fisher, Los Altos, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/526,175

(22) Filed: Sep. 20, 2006

(51) Int. Cl.
*A47K 11/06* (2006.01)
(52) U.S. Cl. .............................. 4/484; 4/482; 4/DIG. 16
(58) Field of Classification Search ................... 4/484, 4/449, 111.6, 316, 431, 482, DIG. 19
See application file for complete search history.

(56) References Cited

U.S. PATENT DOCUMENTS

| | | | | |
|---|---|---|---|---|
| 3,405,454 A | * | 10/1968 | Zeff | 34/371 |
| 3,422,985 A | * | 1/1969 | Rinehart | 4/484 |
| 3,448,467 A | * | 6/1969 | Smith | 4/463 |
| 3,471,871 A | * | 10/1969 | Nociti et al. | 4/484 |
| 3,602,923 A | * | 9/1971 | Girala | 4/144.1 |
| 3,994,028 A | * | 11/1976 | Abom et al. | 4/111.4 |
| 4,955,090 A | * | 9/1990 | Stefan | 4/316 |
| 5,513,404 A | * | 5/1996 | Kanai | 5/604 |
| 6,704,948 B2 | * | 3/2004 | Shirkey | 4/479 |

OTHER PUBLICATIONS

Litwiller, et al., Wet Waste Drying Bags, WMS Telecon, May 25, 2006, NASA Ames Research Center.

* cited by examiner

*Primary Examiner*—Huyen Le
(74) *Attorney, Agent, or Firm*—John F. Schipper; Robert M. Padilla

(57) ABSTRACT

Method and system for processing waste from human activities, including solids, liquids and vapors. A fluid-impermeable bag, lined with a liquid-impermeable but vapor-permeable membrane, defining an inner bag, is provided. A vacuum force is provided to extract vapors so that the waste is moved toward a selected region in the inner bag, extracted vapors, including the waste vapors and vaporized portions of the waste liquids are transported across the membrane, and most or all of the solids remain within the liner. Extracted vapors are filtered, and sanitized components thereof are isolated and optionally stored. The solids remaining within the liner are optionally dried and isolated for ultimate disposal.

6 Claims, 4 Drawing Sheets

SOLID AND LIQUID WASTE DRYING BAG

FIELD OF THE INVENTION

This invention relates to a container that receives and controllably dries waste, using an applied vacuum.

BACKGROUND OF THE INVENTION

Human waste disposal in a spacecraft environment is a troublesome issue. Disposal of liquid wastes and of solid wastes has often required separate approaches. In the absence of gravity, feces does not fall away from the body. Use of water to convey feces and control odors, as with standard flush toilets, also requires gravity.

Diapers were used by spacecraft occupants for the earliest missions. Apollo missions used special purpose plastic bags, attached to the user's posterior with an adhesive flange, and finger cots built into sides of bags facilitated transfer of feces. A number of toilets have been built for subsequent Russian and American missions. Most use air flow to convey feces from the body and to control odors. Most collect feces in individual bags; bag walls contain holes or pores to permit air flow while trapping feces.

Diapers and Apollo bags are not user-friendly. Previous toilets have been bulky and heavy. Small spacecraft such as the Apollo capsule or CEV would benefit from a toilet that is user-friendly yet small.

What is needed is a method of processing, sanitizing and storing the remains of human waste during long space flights and similar missions. Preferably, the method should permit separation of most liquids and vapors associated with human waste from the moist solids that are part of such waste.

SUMMARY OF THE INVENTION

These needs are met by the invention. The invention includes a soft-sided, membrane-lined container or bag that: (1) receives and moves solid waste and liquid waste material and moves such material toward a selected region in the inner bag, using air flow; (2) vaporizes part or all of the liquid waste by creating a modest vacuum within the bag; (3) moves the original vapor and the vaporized liquid waste across the membrane, thereby partly or fully drying the solid waste within the bag; and (4) optionally re-constitutes part of the vaporized liquid waste as water. Two or more of the vacuum forces (1) used to move the waste material toward a selected region in the inner bag, (2) used to create a modest vacuum to (partly) vaporize waste liquids within the inner bag, (3) used to transport the original vapor and vaporized waste liquids across the membrane and (4) used to (partly) dry the waste solids within the inner bag, may be different from each other, with associated vacuums ranging from about 0.1 Torr to about 700 Torr.

Products of the system are clean, but not potable, water and dried, compacted, bagged material that may be human waste or may have other sources. The invention simplifies collection and reduces disposal cost and is suitable for toilet waste and other liquid or water-bearing hazardous or medical waste.

The invention facilitates collection, storage, concentration, and drying of liquid or mixed liquid/solid material. The processed material may be medical waste; aqueous hazardous waste for which disposal cost is high, such as radioactive salt solutions; brine or sludge from water treatment operations. In one embodiment, the invention serves as a portable toilet. Another embodiment can be used to dry biological specimens or to concentrate water samples for analysis.

The invention has several features. The invention addresses the problem of control and movement of feces and waste liquids in microgravity. In the absence of gravitational force, feces does not fall away from the body. Use of water to convey feces and waste liquids and to control odors, as with standard flush toilets, also requires gravity (not relied upon here). Diapers were used by spacecraft occupants for the earliest missions. Apollo missions used special purpose plastic bags, attached to the user's posterior with an adhesive flange, and finger cots built into sides of bags facilitated transfer of feces. A number of toilets have been built for subsequent Russian and American missions. Most use convective air flow to convey feces from the body and to control odors. Most collect feces in individual bags, with bag walls containing holes or pores to permit air flow while trapping feces. Diapers and Apollo bags are not user-friendly. Previous toilets have been large and heavy. Small spacecraft such as the Apollo capsule or CEV would benefit from a toilet that is user-friendly but small.

DESCRIPTION OF BEST MODE OF THE INVENTION

Figure 1:
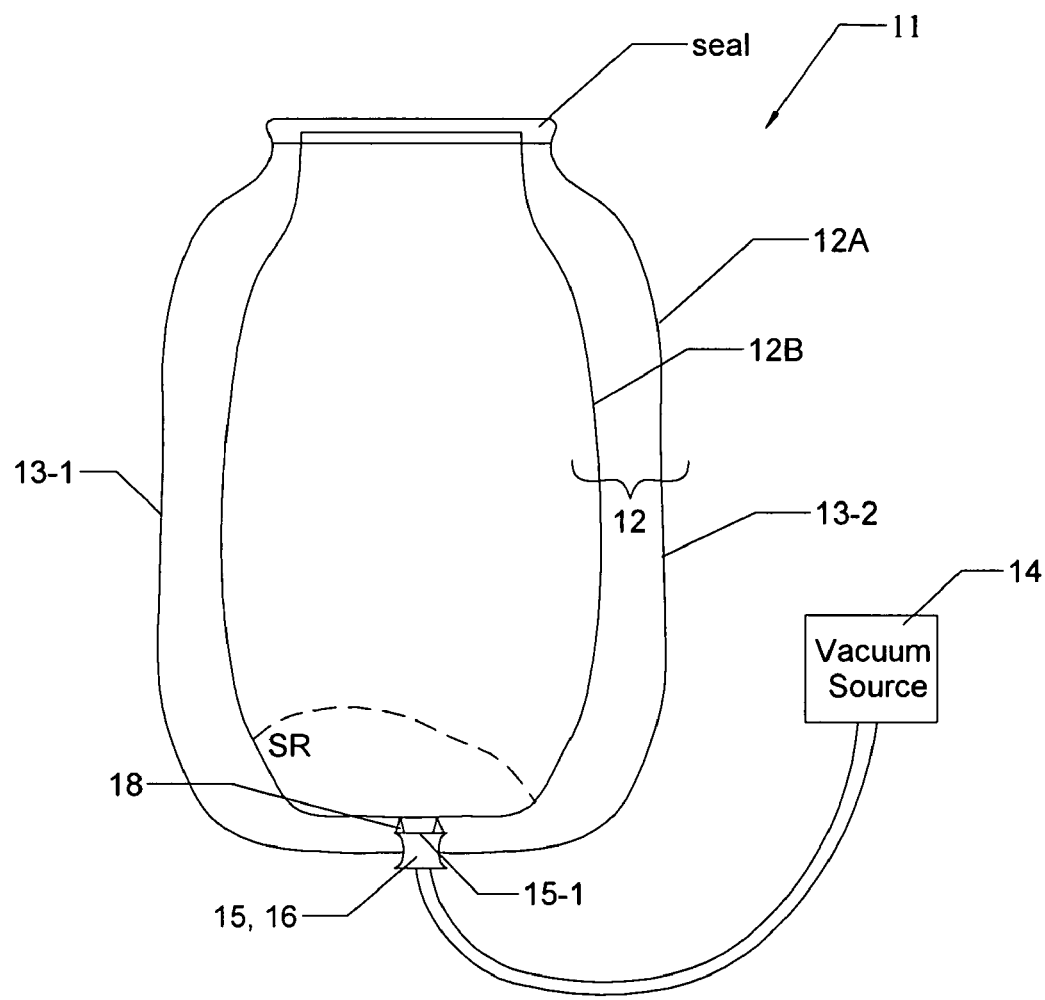
FIG. 1 schematically illustrates a membrane-lined bag used in the invention.

In one embodiment 11 of the invention, a membrane-lined bag 12, illustrated in FIG. 1, has two or more sealed edges, 13-1 and 13-2, and an unsealed edge 13-3, with at least one sealed edge 13-1 having a vacuum source 14 connected to a port 15 by a connection 16. Preferably, a first end 15-1 of the port 15 includes a spacer mechanism 18 that holds the port first end away from adjacent portions of the inner layer 12B so that the vacuum force created at the first end of the port reaches most or all of the inner layer 12B. The spacer mechanism 18 may be a plug (e.g., a cylinder) of highly porous material, or may be two or more rod-like extensions, that extend from the port first end 15-1 to an adjacent portion of the inner layer 12B.

The bag 12 includes a liquid-impermeable and vapor-impermeable outer layer 12A and a liquid-impermeable but vapor-permeable inner layer membrane 12B, defining an inner bag, through which some vapor can pass. The port 15 is located in the outer layer 12A, and activation of the vacuum source 14 causes some of the original vapors and vaporized liquids to pass through the membrane liner 12B. Liquid components of the moist waste solids within the bag 12 may also be vaporized and transported across the membrane 12B. Waste solids, such as feces, remain in an inner layer defined by the membrane 12B and are partly dried by withdrawal of vaporized liquid and vaporized liquid components in the moist solids. Feces is thereby trapped and sealable in the bag 12, while the original vapors and the vaporized portion of the liquids pass through the membrane 12B and are received by an outer bag defined by the membrane 12B and the outer layer 12A of the bag 12. After use, the bag 12 is sealed and stored for ultimate disposal.

Vacuum venting of vapor through the membrane 12B has several advantages. First, the vacuum force tends to move any waste introduced into the inner bag toward a selected region SR adjacent to the port 15 in the outer layer 12A, thereby compensating for possible absence of a gravitational force that would otherwise move human waste toward a designated "bottom" of the bag. Second, removal of the vaporized liquids and original vapors from the waste material that is originally in the inner bag reduces the storage volume and mass and temperature of the vacuum dried solid material that remains. Third, feces, which is the strongest odor-producing portion of the waste, is isolated from the remainder after processing and can be stored or disposed of separately from the reminder. Fourth, vacuum-dried waste is more stable than non-dried waste. Fifth, venting of the vapor removes about 2.26 kilo-Joules of heat per gm of water.

Figure 2:
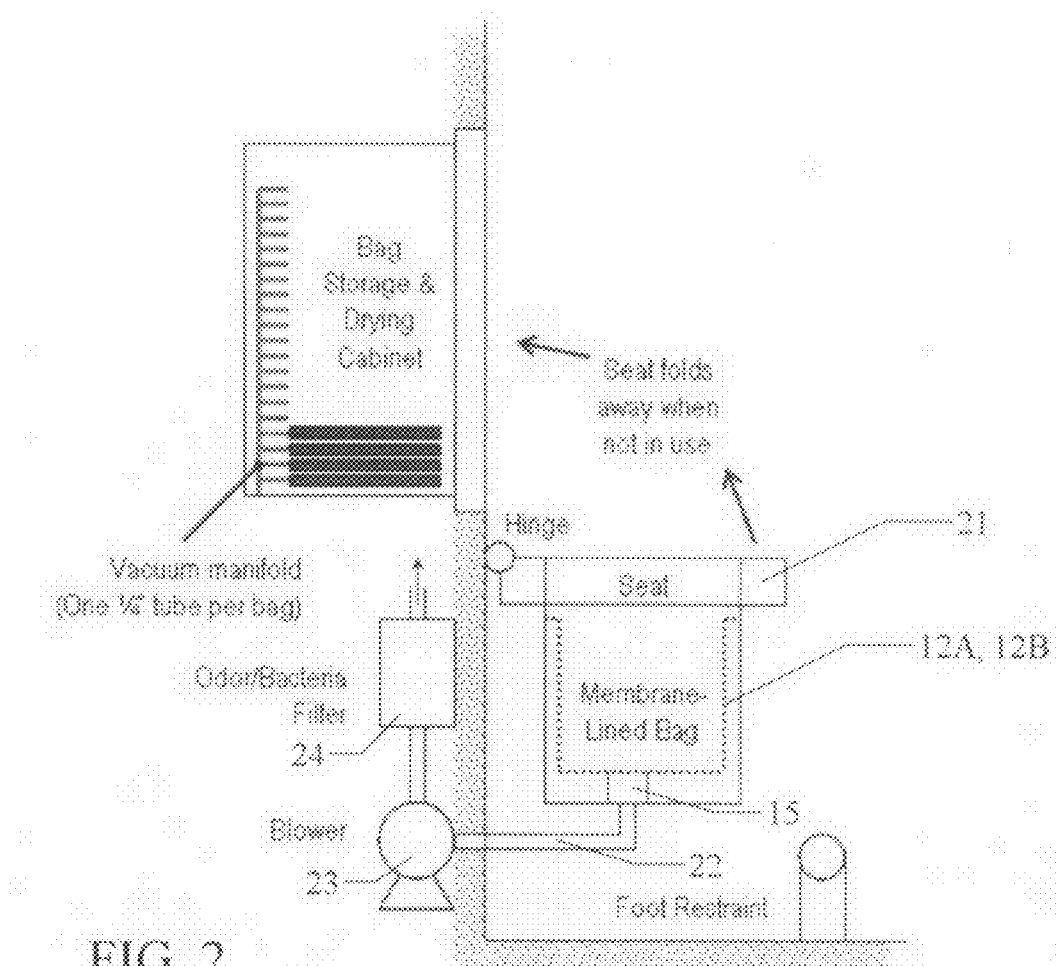
FIG. 2 illustrates an anchored waste disposal system used in the invention.
Figure 3:
FIG. 3 illustrates a portable waste disposal system used in the invention.

One waste disposal system for use of the invention is illustrated in FIG. 2 and includes a hinged "seat" 21 on which a user (not shown) sits. The seat 21 has inserted therein a membrane-lined bag 12A/12B with a port 15, shown in greater detail in FIG. 1. The port 15 is connected by a conduit or connection 22 to a blower or vacuum source 23 that redirects the liquid and vapor, drawn through the membrane 12B, through an odor/microbial filter 24. The filtered fluid leaving the filter 24 is vented to the atmosphere or is otherwise disposed of. The filter 24 is changed periodically, and used filters and used bags 12A/12B are stored in an isolation cabinet for ultimate disposal. Unused bags 12A/12B are stored in an adjacent cabinet. The user seat 21 may also be portable, rather than being attached to a wall, as illustrated in FIG. 3.

Figure 4:
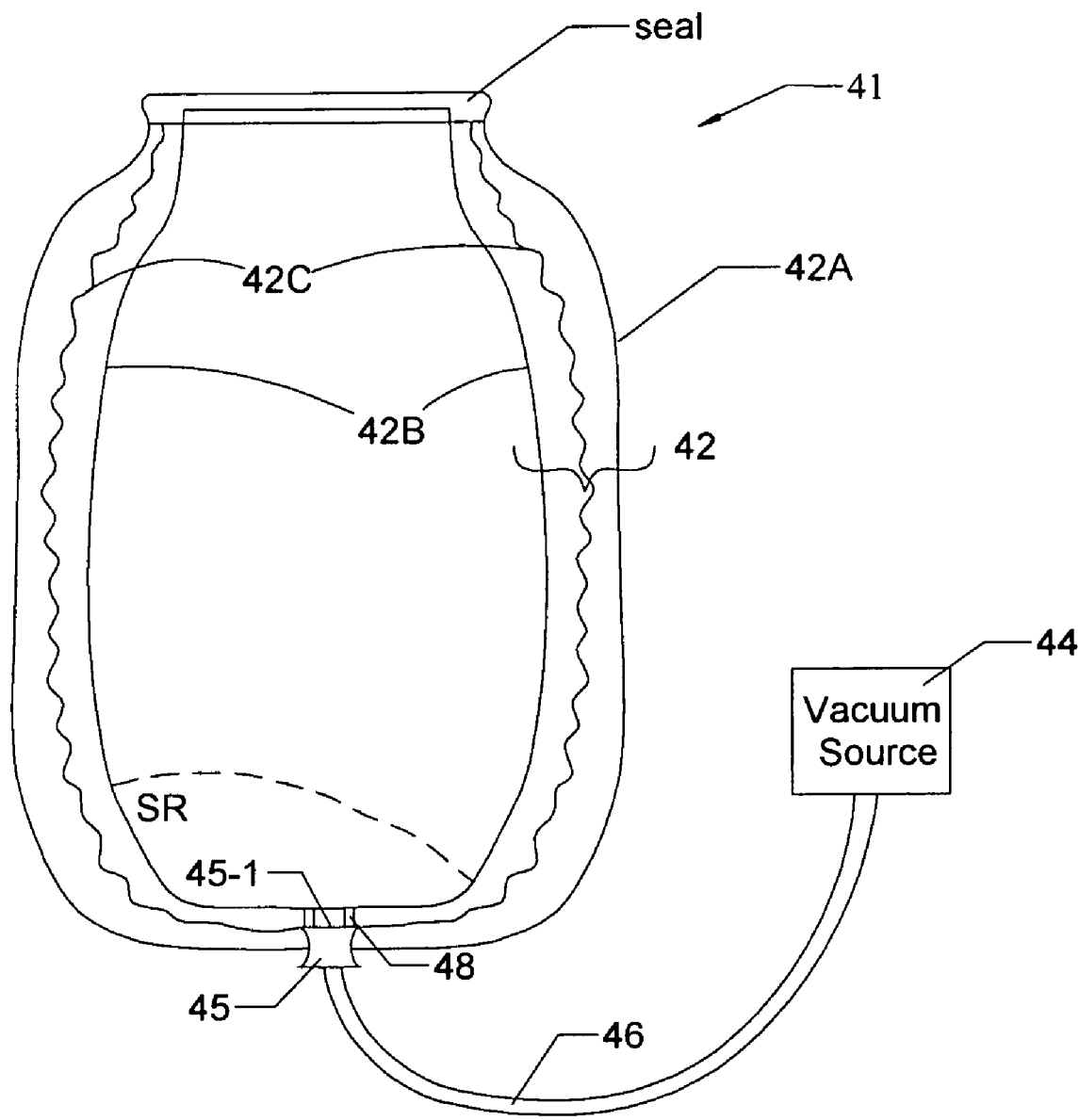
FIG. 4 schematically illustrates an alternative membrane-lined bag for use in the invention.

FIG. 4 illustrates another embodiment 41 of the invention, in which a bag 42 includes a liquid-impermeable and vapor-impermeable outer layer 42A, a liquid-impermeable but vapor-permeable inner layer membrane 42B through which some vapor can pass and a third intermediate layer 42C, positioned between the inner layer 42B and the outer layer 42A. The intermediate layer 42C holds the outer layer 42A away from the inner layer by at least a small distance, to permit or encourage passage of air and other gases in the intermediate volume 43 between the inner and outer layers.

The intermediate layer 42C may be a rippled screen or mesh, preferably with mesh diameters of at least 2 mm, that holds the inner and outer layers apart wherever the screen intervenes. The intermediate layer 42C may be a porous fabric or firm projection, having pores or other openings that are large enough (e.g. at least 0.5-2 mm) to permit or encourage passage of air or other fluids through the fabric or projection between the outer layer 42A and the inner layer 42B. The bag in FIG. 1 or 4 is intended to provide a mechanism for (1) collection of waste material; (2) movement of waste toward a designated region in the bag, without use of water or gravity; (3) evaporation of liquid from the liquid waste, and drying of the solid waste and (4) storage of the remaining waste. A vacuum source 44, port 45, connection 46 and spacer mechanism 48 operate as do the respective vacuum source 14, port 15, connection 16 and spacer mechanism 18 in FIG. 1.

Figure 5:
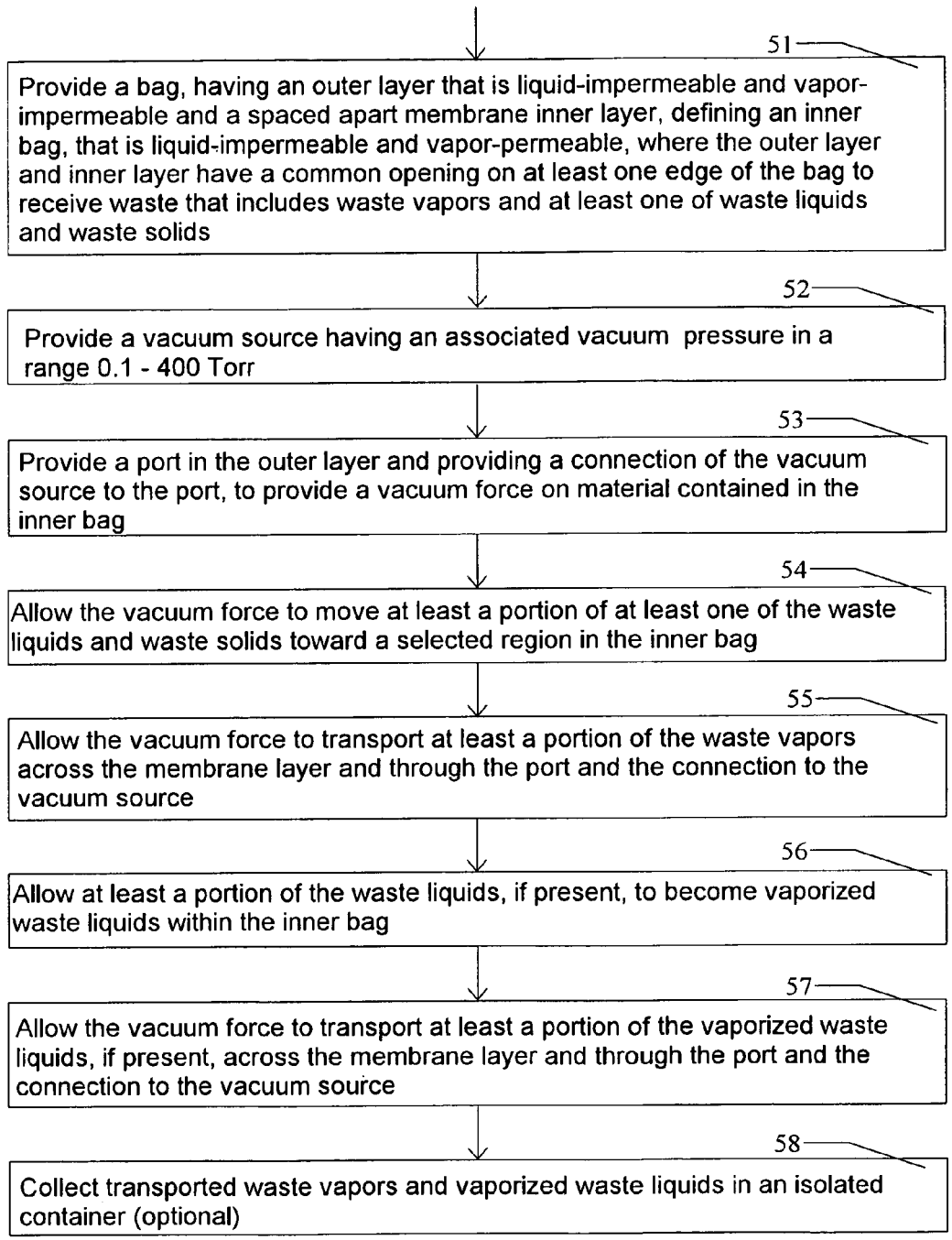
FIG. 5 is a flow chart of a procedure for practicing the invention.

FIG. 5 is a flow chart of a procedure for practicing the invention. In step 51, a bag is provided, having an outer layer that is liquid-impermeable and vapor-impermeable and having an inner membrane layer that is liquid-permeable and vapor-permeable, where the outer layer and the inner layer have a common opening on one edge of the bag to receive waste material that includes waste vapors and at least one of waste liquids and waste solids.

In step 52, a vacuum source is provided, having an associated relatively weak vacuum pressure in a range 0.1-700 Torr, or lower vacuum if desired. In step 53, a port is provided in the outer layer, and a connection is provided of the port to the vacuum source, to provide a vacuum force on material contained in the inner bag. In step 54, the vacuum force is allowed to move at least a portion of at least one of the waste liquids and the waste solids toward a selected region in the inner bag. In step 55, the vacuum force is allowed to transport at least a portion of the waste vapors across the membrane layer and through the port and the connection to the vacuum source.

In step 56, at least a portion of the waste liquids, if present, is allowed to vaporize and to become vaporized waste liquids within the inner bag. In step 57, the vacuum force is allowed to transport at least a portion of the vaporized waste liquids, if present, across the membrane layer and through the port and the connection to the vacuum source. In step 58 (optional), the transported waste vapors and vaporized waste liquids, if present, are collected in an isolated container, for storage or other processing. In step 59 (optional), the waste solids, if present, are collected in an isolated container. Optionally, a spacer mechanism between inner bag and outer layer is provided, as discussed in the preceding.

What is claimed is:

1. A method for processing waste from human activities, the method comprising:

providing a soft sided bag, having an outer layer that is liquid-impermeable and vapor-impermeable and having an inner membrane layer, defining an inner bag, that is liquid-permeable and vapor-permeable, where the outer layer and the inner layer have a common opening on at least one edge of the bag to receive waste material that includes waste vapors and at least one of waste liquids and waste solids;

providing a vacuum source, having an associated vacuum pressure in a range of about 1-400 Torr;

providing a port in the outer layer and providing a connection of the vacuum source to the port, to exert a vacuum force on material contained in the inner bag and to exert the vacuum force on material contained between the inner layer and the outer layer;

allowing the vacuum force to move at least a portion of at least one of the waste liquids and waste solids toward a selected region in the inner bag;

allowing the vacuum force to transport at least a portion of the waste vapors across the membrane layer and through the connection to the vacuum source;

allowing at least a portion of the waste liquids, if present, to vaporize and to become vaporized waste liquids within the inner bag; and allowing the vacuum force to transport at least a portion of the vaporized waste liquids, if present, across the membrane layer and through the connection to the vacuum source.

2. The method of claim 1, further comprising:

providing said bag as a component of a commode that includes a seat for a human and includes a mechanism for accepting said bag in a configuration that receives said waste material through said common opening.

3. The method of claim 1, further comprising providing an intermediate layer that is permeable to vapors and liquids and that is positioned between and provides a space between at least a portion of said inner layer and said outer layer.

4. A system for processing waste from human activities, the system comprising:

a soft sided bag, having an outer layer that is liquid-impermeable and vapor-impermeable and having an inner membrane layer, defining an inner bag, that is liquid-permeable and vapor-permeable, where the outer layer and the inner layer have a common opening on at least one edge of the bag to receive waste material that includes waste vapors and at least one of waste liquids and waste solids;

a vacuum source, having an associated vacuum pressure in a range of about 1-400 Torr;

a port formed in the outer layer;

a connection of the vacuum source to the port, to exert a vacuum force on material contained in the inner bag and to exert the vacuum force on material contained between the inner layer and the outer layer, wherein:

the vacuum force moves at least a portion of at least one of the waste liquids and waste solids toward a selected region in the inner bag;

the vacuum force transports at least a portion of the waste vapors across the membrane layer and through the connection to the vacuum source;

at least a portion of the waste liquids, if present, is allowed to vaporize and to become vaporized waste liquids within the inner bag; and the vacuum force transports at least a portion of the vaporized waste liquids, if present, across the membrane layer and through the connection to the vacuum source.

5. The system of claim 4, further comprising:

a commode that includes a seat for a human and includes a mechanism for accepting said bag in a configuration that receives said waste material through said common opening.

6. The system of claim 4, further comprising an intermediate layer that is permeable vapors and liquids and that is positioned between, and provides a space between, at least a portion of said inner layer and said outer layer.

* * * * *